(No Model.)
D. MOTT.
WHEEL CULTIVATOR.
No. 525,054. Patented Aug. 28, 1894.
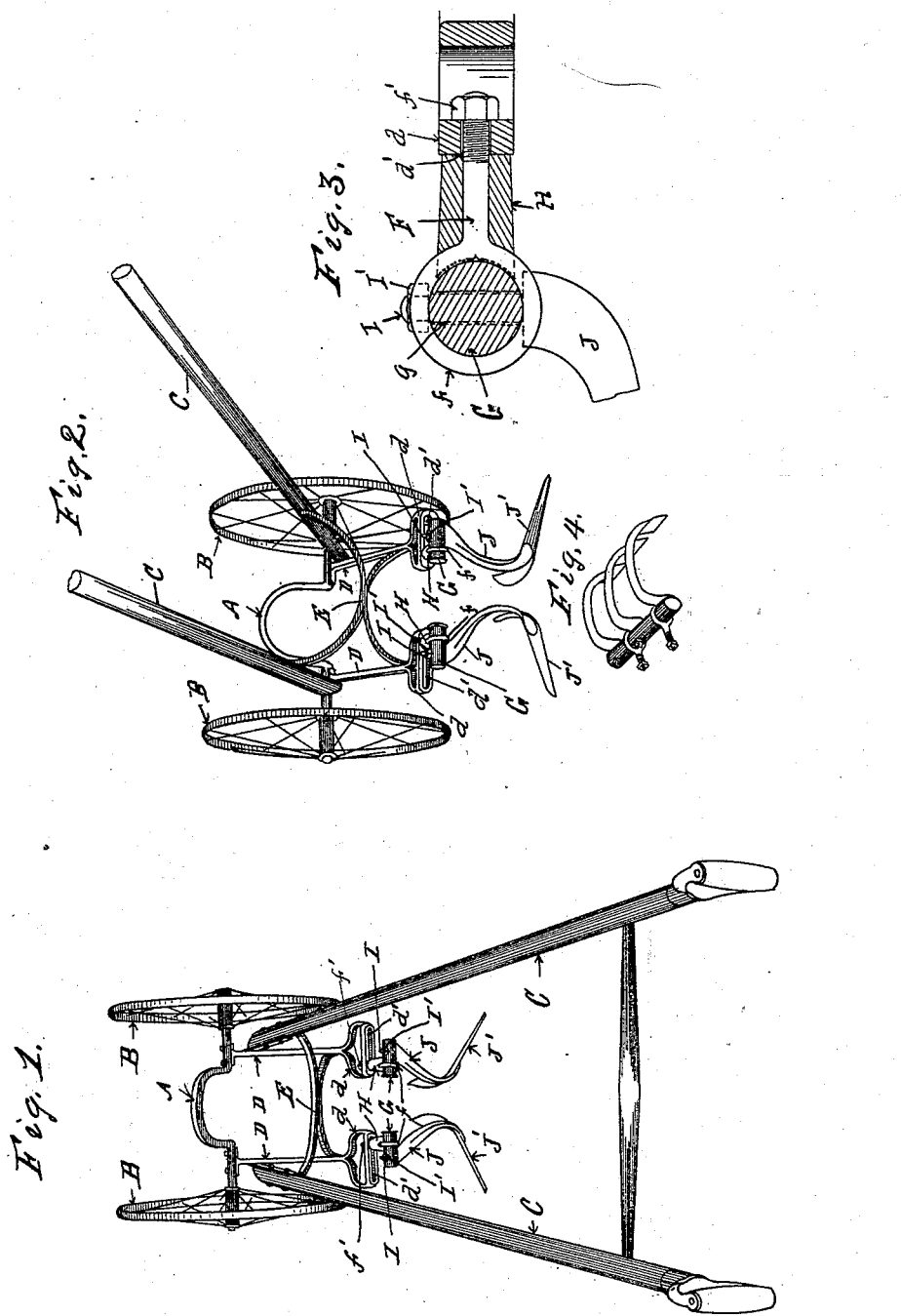
Witnesses.
F. Einfeldt
A. L. Jackson
Inventor.
Daniel Mott
By Sturgeon
Atty.

UNITED STATES PATENT OFFICE.

DANIEL MOTT, OF FAIRPLAIN, PENNSYLVANIA.

WHEEL-CULTIVATOR.

SPECIFICATION forming part of Letters Patent No. 525,054, dated August 28, 1894.

Application filed May 4, 1894. Serial No. 510,102. (No model.)

*To all whom it may concern:*

Be it known that I, DANIEL MOTT, a citizen of the United States, residing at Fairplain, in the county of Erie and State of Pennsylvania, have invented certain new and useful Improvements in Wheel-Cultivators; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in wheel cultivators, hereinafter set forth and explained and illustrated in the accompanying drawings, in which—

Figure 1. is a top or plan view of my improved wheel cultivator. Fig. 2. is a rear view of the same. Fig. 3. is a sectional view of one of the adjustable joints supporting the cultivator shovels. Fig. 4. is a perspective view of a modified form of shovel for my improved cultivator.

The principal object of my invention is to so construct the mechanism which supports the cultivator shovels, that the shovels can be adjusted, not only in and out from each other, but also at any desired angle to each other. To accomplish this end, I have devised a universal joint, by means whereof the shovels are secured to the cultivator frame, which accomplishes the object desired.

In the construction of my improved wheel cultivator, illustrated in the accompanying drawings, A is the axle, B B the wheels and C C the handles, which are of the usual construction. To the rear of the axle A near the wheels B B, I secure rearwardly projecting arms D D, the rear ends of these arms being braced to the handles C C by means of a double brace E, so as to form the frame of the cultivator. The rear ends $d$ $d$ of the arms D D are made stirrup shaped, and through slots $d'$ in the outer ends thereof, the ends of ring bolts F pass, the rings $f$ on the outer ends of said bolts encircling cylindrical pieces of metal G, and surrounding the shank of the bolt F between the part G and the end of the stirrup $d$ is a sleeve H, which, when the nut $f'$ on the bolt F is tightened up, serves to hold the part G rigidly in whatever position it may be adjusted with relation to the end of the stirrup $d$. Through the cylindrical part G there is a bolt hole $g$ (shown in dotted lines in Fig. 3) through which a bolt I secured to the upper end of the cultivator shovel shank J passes, so that by loosening the nut I' thereon, the shovel shank J can be turned to the right or the left as desired, and again tightened up in such position; while by loosening the nut, the part G and sleeve H can be moved in or out in the slot $d'$, and can also be rotated so as to bring the shovel blade J' to any desired angle with relation to the end of the stirrup $d$.

Having thus fully described my invention, so as to enable others to construct and use the same, what I claim as new, and desire to secure by Letters Patent of the United States, is—

1. In a wheel cultivator, the combination, with the rearwardly-projecting arms D secured to the cultivator frame and provided with stirrup-shaped ends having horizontal slots $d'$ in their outer ends, of the ring bolts adjustable laterally and circumferentially in the said slots, the bars G carried by the ring bolts, and the cultivator shovels having their shanks secured to the said bars, substantially as set forth.

2. In a wheel cultivator, the combination, with the rearwardly-projecting arms D secured to the cultivator frame and provided with stirrup-shaped ends having horizontal slots $d'$ in their outer ends, of the ring bolts provided with nuts and adjustable laterally and circumferentially in the said slots, the bars G journaled horizontally in the said ring bolts, the sleeves H encircling the shanks of the said ring bolts and provided with concave rear ends abutting against the bars G and operating to clamp them and the ring bolts when the said nuts are screwed up, and the cultivator shovels provided with shanks journaled in vertical holes in the bars G and having nuts for clamping the said shanks to the said bars, substantially as set forth.

In testimony whereof I affix my signature in presence of two witnesses.

DANIEL MOTT.

Witnesses:
CHAS. MERTENS,
JOHN S. RILLING.